United States Patent
Frea et al.

(10) Patent No.: US 11,904,824 B2
(45) Date of Patent: Feb. 20, 2024

(54) METHOD FOR DETECTING A BRAKING ACTION OF A RAILWAY VEHICLE AND EMERGENCY BRAKING METHOD OF A RAILWAY VEHICLE

(71) Applicant: FAIVELEY TRANSPORT ITALIA S.P.A., Turin (IT)

(72) Inventors: Matteo Frea, Turin (IT); Roberto Tione, Turin (IT)

(73) Assignee: FAIVELEY TRANSPORT ITALIA S.P.A., Turin (IT)

( * ) Notice: Subject to any disclaimer, the term of this patent is extended or adjusted under 35 U.S.C. 154(b) by 390 days.

(21) Appl. No.: 17/310,731

(22) PCT Filed: Feb. 20, 2020

(86) PCT No.: PCT/IB2020/051417
§ 371 (c)(1),
(2) Date: Aug. 19, 2021

(87) PCT Pub. No.: WO2020/170183
PCT Pub. Date: Aug. 27, 2020

(65) Prior Publication Data
US 2022/0118962 A1    Apr. 21, 2022

(30) Foreign Application Priority Data

Feb. 21, 2019 (IT) .................. 102019000002533

(51) Int. Cl.
*G01G 19/04* (2006.01)
*B60T 17/22* (2006.01)
*B60T 8/92* (2006.01)

(52) U.S. Cl.
CPC ............... *B60T 17/22* (2013.01); *B60T 8/92* (2013.01); *B60T 2270/402* (2013.01); *B60T 2270/406* (2013.01)

(58) Field of Classification Search
CPC ...... B60T 17/22; B60T 8/92; B60T 2270/402; B60T 2270/405
(Continued)

(56) References Cited

U.S. PATENT DOCUMENTS 11,312,350 B2 * 4/2022 Martin ................ B61L 15/0081
2009/0273232 A1 * 11/2009 Barlsen .................... B60T 8/327
303/198
(Continued)

FOREIGN PATENT DOCUMENTS

CA        2844951 A1 *  9/2014 .......... B60G 17/005
DE   102015115852 A1    3/2017
(Continued)

OTHER PUBLICATIONS

Japanese Patent Office, Office Action Issued in Application No. 2021-549152, dated Jan. 17, 2023, 6 pages. (Submitted with Partial Translation).
(Continued)

*Primary Examiner* — Christopher P Schwartz
(74) *Attorney, Agent, or Firm* — McCoy Russell LLP

(57) ABSTRACT

A method is described for detecting a braking action of a railway vehicle (RV) comprising monitoring the load transfer to a first axle of the railway vehicle (RV) from a second axle following the first axle according to the direction of travel (d) and, if the load transfer exceeds a predetermined threshold, determining that the railway vehicle (RV) is braking. An emergency braking method is also described comprising detecting an emergency braking request, activating an electrodynamic braking system to decelerate the railway vehicle when the emergency braking request is detected, applying the method to detect a braking action of a railway vehicle and, if so, determining that the electrodynamic braking system is operating correctly and using the (Continued)

electrodynamic braking system to fulfill at least partially the emergency braking request.

12 Claims, 4 Drawing Sheets

(58) Field of Classification Search
USPC .................. 303/9.61, 9.67, 9.69, 128, 198
See application file for complete search history.

(56) References Cited

U.S. PATENT DOCUMENTS

| 2019/0054907 | A1* | 2/2019 | Skrabak | B60T 8/1766 |
| 2020/0198430 | A1* | 6/2020 | Bianco | B60G 17/08 |
| 2023/0122725 | A1* | 4/2023 | Frea | G06T 7/62 |
| | | | | 177/163 |

FOREIGN PATENT DOCUMENTS

| EP | 3056297 A1 | 8/2016 |
| FR | 2775773 A1 | 9/1999 |
| WO | 9836955 A1 | 8/1998 |
| WO | 2009154048 A1 | 12/2009 |
| WO | 2018069326 A2 | 4/2018 |

OTHER PUBLICATIONS

ISA European Patent Office, International Search Report Issued in Application No. PCT/IB2020/051417, dated Apr. 28, 2020, WIPO, 5 pages.

ISA European Patent Office, Written Opinion of the International Searching Authority Issued in Application No. PCT/IB2020/051417, dated Apr. 28, 2020, WIPO, 5 pages.

* cited by examiner

METHOD FOR DETECTING A BRAKING ACTION OF A RAILWAY VEHICLE AND EMERGENCY BRAKING METHOD OF A RAILWAY VEHICLE

CROSS REFERENCE TO RELATED APPLICATIONS

The present application is a U.S. National Phase of International Application No. PCT/IB2020/051417 entitled "METHOD FOR DETECTING A BRAKING ACTION OF A RAILWAY VEHICLE AND EMERGENCY BRAKING METHOD OF A RAILWAY VEHICLE," and filed on Feb. 20, 2020. International Application No. PCT/IB2020/051417 claims priority to Italian Patent Application No. 102019000002533 filed on Feb. 21, 2019. The entire contents of each of the above-listed applications are hereby incorporated by reference for all purposes.

TECHNICAL FIELD

The present invention is generally in the field of braking methods of railway vehicles; in particular, the invention refers to a method to detect a braking action of a railway vehicle and an emergency braking method of a railway vehicle.

BACKGROUND AND SUMMARY

Conventional railway braking systems perform different functions characterized by the state in which the railway vehicle is found. The two main functions are known as "service braking" and "emergency braking". Service braking is the state wherein the railway vehicle has decelerated during normal phases of operational service. In this state, the braking performance must be guaranteed with a probability of failure of less than $10^{-7}$. This value corresponds to the Safety Integrity Level SIL2 referred to in the standard EN50126.

Emergency braking is the state wherein the train must provide braking within a stopping distance predetermined by international standards, with a probability of not achieving the performance typically equal to or less than $10^{-9}$. Such value corresponds to the Safety Integrity Level SIL4 of the standard EN50126.

With regard to the execution of service braking, the braking systems relating to railway vehicles are now entirely managed by electronic controls interacting with the control systems of traction motors used in regenerative mode during braking, i.e. electrodynamic braking, and with TCMS systems, "Train Control and Monitoring Systems", for a continuous exchange of diagnostic information and real-time management of ways to compensate for possible malfunctions of the service brake system or of the electrodynamic brake.

Such execution by means of electronic systems has increased passenger comfort considerably, for example, by guaranteeing tolerable acceleration variations or by dynamically compensating the variation of the friction coefficients of the friction materials as the speed changes while keeping the deceleration uniform.

On the other hand, such electronic service braking control systems have become increasingly complex, based on microprocessor architectures executing significant quantities of software code linked not only to real-time processes for brake management but also to the management of diagnostic processes of the complete braking system and to the management of complex communication protocols such as ethernet or MVB. For this reason, the main operators in the sector prefer to use purely pneumatic solutions during the emergency braking phase.

Moreover, the main operators in the sector prefer to use purely pneumatic solutions during the emergency braking phase also because it is not possible to verify the correct operation of the electronic controls interacting with the traction motor control systems, used in a regenerative way during braking, i.e. electrodynamic braking.

This is demonstrated by the publication of the railway standard EN16185. This standard standardizes the braking systems which provide two concurrent pneumatic request channels for emergency braking.

The reason for this choice by the operators is linked to the intrinsic high safety coefficient and reliability demonstrated over time by the pneumatic architectures and by the pneumatic components used, contrary to the lower reliability of electronic systems. The lower reliability is mainly linked to the potential presence of common-mode software faults that may occur simultaneously on the entire train during an emergency braking, partially or totally compromising the achievement of the stopping distances. However, this technological choice is starting to conflict with the ever-increasing demands for accuracy in stopping distances during emergency braking.

In view of these limitations, even though the railway vehicle has electronic controls interacting with traction motor control systems used in a regenerative way during braking, i.e. electrodynamic braking, which are commonly used during service braking, such electrodynamic braking is not used during emergency braking. Conversely, only pneumatic systems and components are used during emergency braking, despite the latter being subject to inaccuracy caused by the dependence on the temperature of the springs and of the rubber sub-components and on the aging thereof.

In a further aspect, in known railway vehicles, in order to verify that the braking system is working correctly and that the railway vehicle is actually slowing down, it is necessary to know in real time the travel speed of the railway vehicle and/or the instantaneous deceleration of the same vehicle. The estimation of the vehicle travel speed from the measurement of the angular speed of the wheels (achieved by means of appropriate sensors and tone wheels) is not always reliable, for example in case of total or partial wheel skid due to degraded grip conditions. Systems providing for the use of dedicated satellites (GPS systems) are not always available, for example in areas with low/no coverage and/or in tunnels. Inertial systems or accelerometers are difficult to calibrate and subject to the influence of vibrations during the vehicle's travel. Moreover, the technological solutions cited above, even if used in a hybrid way, still require a dedicated installation with the resulting costs. DE 10 2015 11 5852 A1 describes a method for detecting a braking action, but the problems described above remain unresolved.

SUMMARY OF THE INVENTION

An object of the present invention is thus to provide a solution to verify the correct operation of a braking system of a railway vehicle. This solution is more reliable than the known solutions and reduces the aforesaid costs by making use of devices and sensors (suspensions) normally already installed on the railway vehicle for other primary purposes.

A further object of the present invention is to provide a solution that allows the safe use of the electrodynamic braking system of a railway vehicle even during an emergency braking.

The aforesaid and other objects and advantages are achieved, according to an aspect of the invention, by a method for detecting a braking action of a railway vehicle having the features defined in claim 1 and by an emergency braking method of a railway vehicle according to claim 10. Preferential embodiments of the invention are defined in the dependent claims, the content of which is intended as an integral part of the present description.

BRIEF DESCRIPTION OF THE FIGURES

The functional and structural features of some preferred embodiments of a method for detecting a braking action of a railway vehicle and of an emergency braking method of a railway vehicle according to the invention shall now be described. Reference is made to the accompanying drawings, wherein.

DETAILED DESCRIPTION

Figure 1:
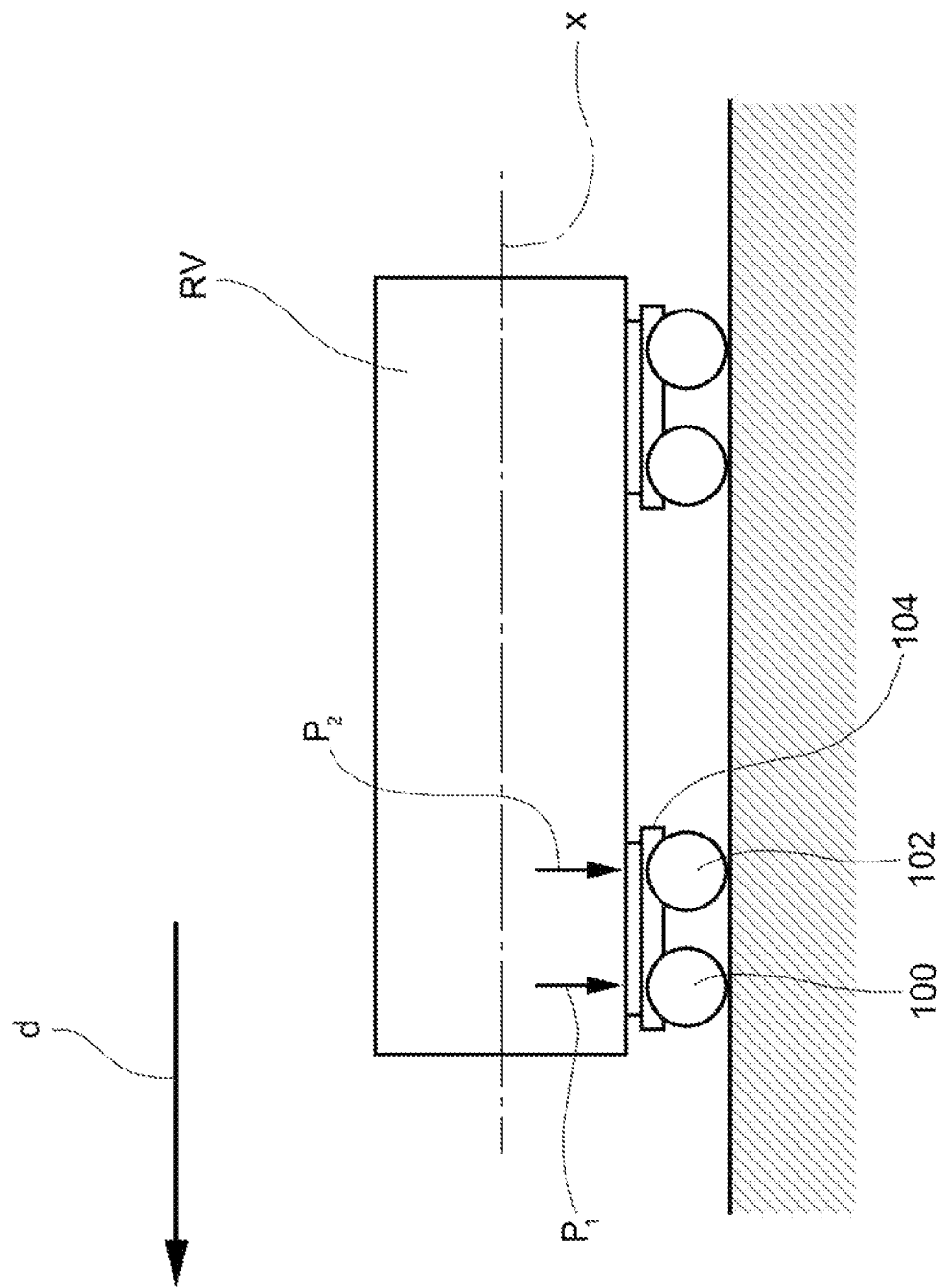
FIG. 1 illustrates the load distribution between two axles of the same bogie of a railway vehicle when the latter is not subject to a braking action.

Before explaining in detail a plurality of embodiments of the invention, it should be clarified that the invention is not limited in its application to the constructive details and to the configuration of the components presented in the following description or illustrated in the drawings. The invention may assume other embodiments and may in practice be implemented or achieved in different ways. It should also be understood that the phraseology and terminology have a descriptive purpose and should not be construed as limiting. The use of "include" and "comprise" and the variations thereof are to be understood as encompassing the elements stated hereinafter and the equivalents thereof, as well as additional elements and the equivalents thereof.

Referring initially to FIG. 1, a method for detecting a braking action of a railway vehicle RV comprises the steps of:
  monitoring the load transfer towards a first axle 100 of the railway vehicle RV from a second axle 102 of the railway vehicle RV, following the first axle 100 according to the direction of travel d of the railway vehicle;
  if the load transfer exceeds a predetermined threshold, determining that the railway vehicle RV is braking.

With the second axle 102 of the railway vehicle RV, following the first axle 100, one may understand the case wherein the second axle 102 is the axle that is arranged immediately following the first axle 100, i.e. the case wherein there are no other axles between them, or the case wherein the second axle 102 is arranged following the first axle 100 but there are one or more axles between them.

Load transfer is defined as the change in the weight shares weighing on the first axle and on the second axle of the railway vehicle with respect to the static situation.

Preferably, the step of monitoring the load transfer towards a first axle 100 of the railway vehicle RV from a second axle 102 of the railway vehicle RV may comprise the steps of:
  measuring a pressure P1 acting on the first axle 100 of the railway vehicle RV;
  measuring a pressure P2 acting on the second axle 102 of the railway vehicle RV; and
  determining the load transfer through the difference between the measured pressure P1 acting on the first axle 100 and the measured pressure P2 acting on the second axle 102.

Preferably, the pressure P1 acting on the first axle 100 of the railway vehicle RV may be measured through a measurement of a pressure of a first pneumatic shock absorber associated with said first axle 100, and the pressure P2 acting on the second axle 102 of the railway vehicle may be measured through a measurement of a pressure of a second pneumatic shock absorber associated with said second axle 102.

Moreover, the pressure acting on the first axle of the railway vehicle may preferably be measured through a first strain gauge sensor means, for example a strain gauge, provided to measure a deformation of a first spring of a first shock absorber associated with said first axle, and the pressure acting on the second axle of the railway vehicle may be measured through a second strain gauge sensor means, for example a strain gauge, provided to measure a deformation of a second spring of a second shock absorber associated with said second axle.

The acting pressures may then be derived as a function of the deformation of the respective springs, for example through the use of appropriate conversion formulas.

As may be seen from the figures, during a braking action, the railway vehicle undergoes a pitch inclination A in relation to a rest plane x. Therefore, preferably, the step of monitoring the load transfer to a first axle of the railway vehicle from a second axle of the railway vehicle may comprise the steps of measuring the pitch inclination of the railway vehicle and determining a load transfer value as a function of the measured pitch inclination.

The pitch inclination of the railway vehicle may be measured through a gyroscopic sensor means, for example a gyroscope. Likewise, the pitch inclination A of the railway vehicle may be measured through an accelerometric sensor means, for example an accelerometer.

Figure 2:
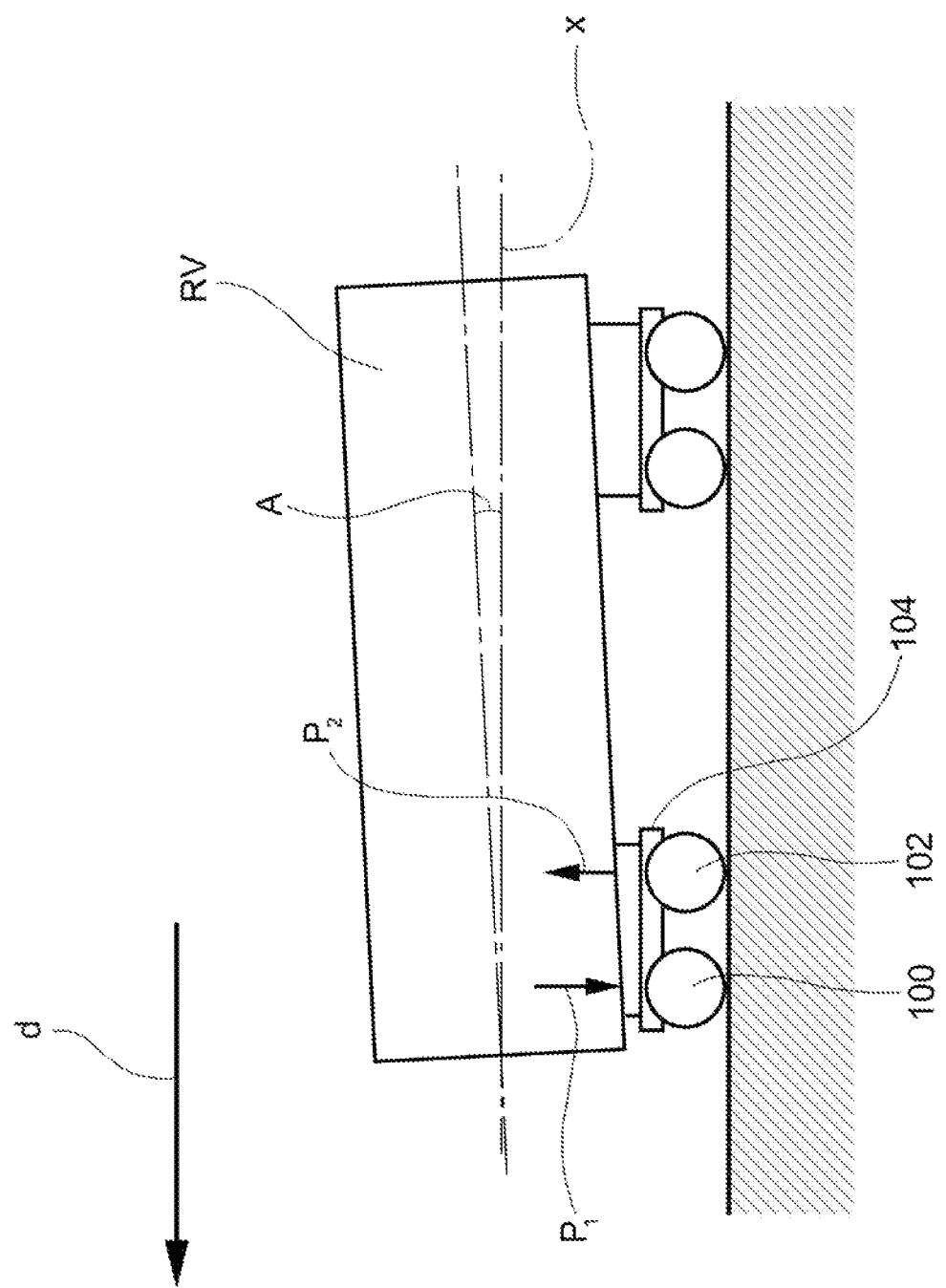
FIG. 2 illustrates the load distribution between two axles of the same bogie of a railway vehicle when the latter is subject to a braking action.

As illustrated in FIGS. 1 and 2, preferably the first axle 100 and the second axle 102 belong to a same bogie 104.

Figure 3:
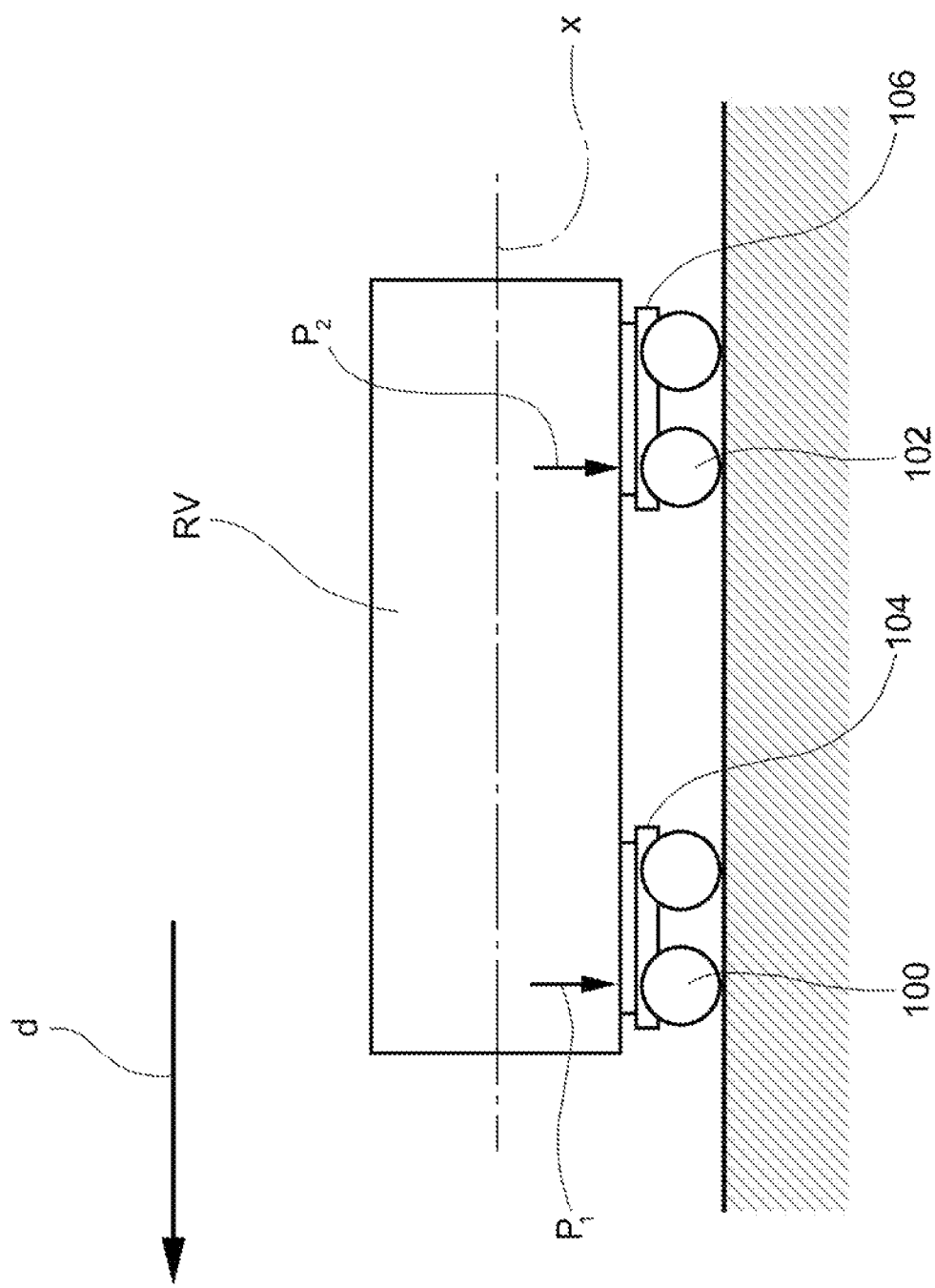
FIG. 3 illustrates the load distribution between two axles of two separate bogies of a railway vehicle when the latter is not subject to a braking action.
Figure 4:
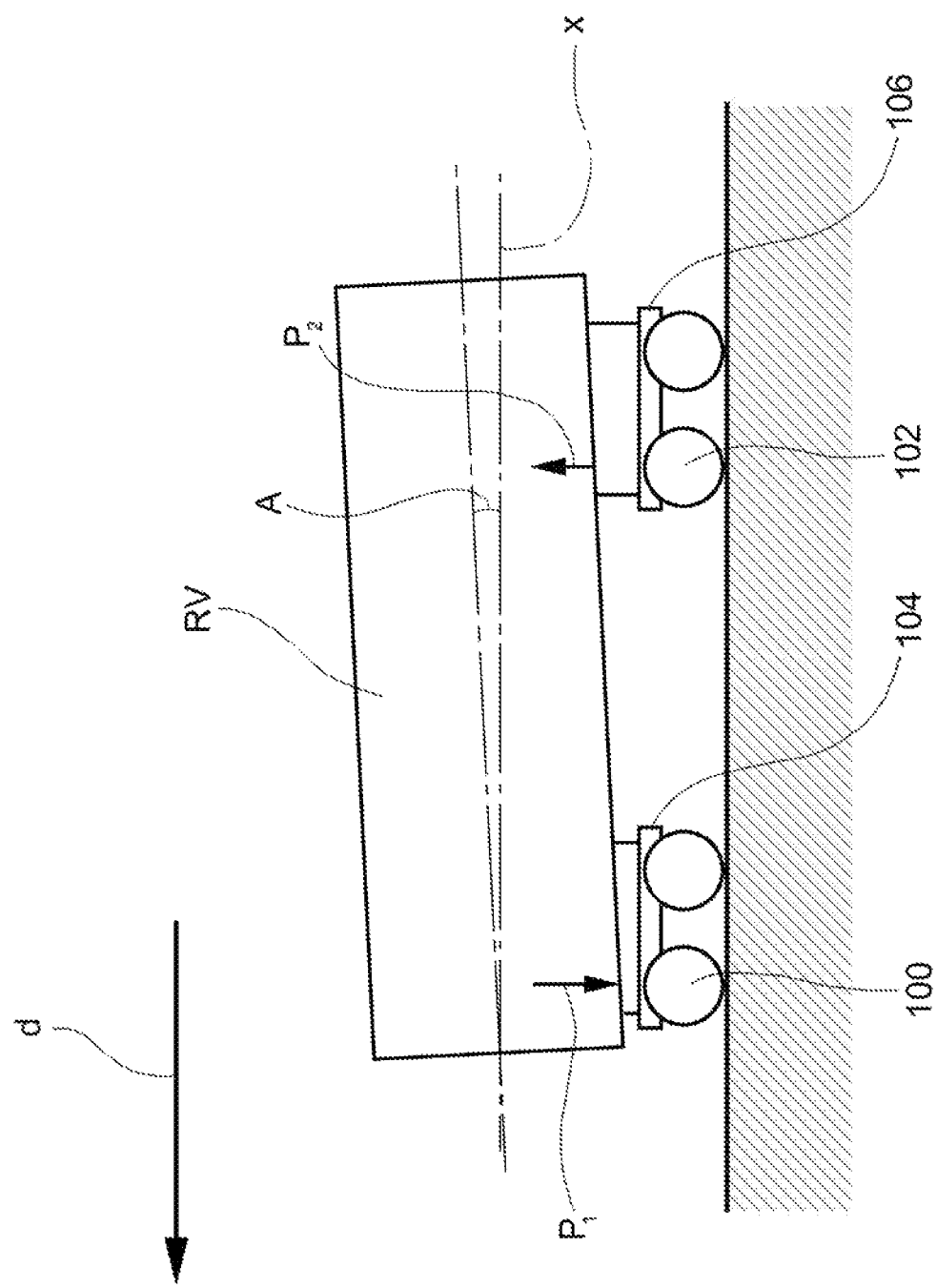
FIG. 4 illustrates the load distribution between two axles of two separate bogies of a railway vehicle when the latter is subject to a braking action.

Likewise, as illustrated in FIGS. 3 and 4, preferably the first axle 100 and the second axle 102 belong to two separate bogies 104 and 106.

The present invention further concerns an emergency braking method of a railway vehicle RV.

This emergency braking method of a railway vehicle RV comprises the steps of:
  detecting an emergency braking request;
  when the emergency braking request has been detected, activating an electrodynamic braking system to decelerate the railway vehicle;
  applying the method for detecting a braking action of a railway vehicle according to any one of the previously described embodiments;
  if it has been determined that the railway vehicle is braking, determining that the electrodynamic braking system is operating correctly and using the electrodynamic braking system to at least partially fulfill the emergency braking request;

if it has been determined that the railway vehicle is not braking, determining that the electrodynamic braking system is not operating correctly and using a pneumatic braking system to fulfill the emergency braking request.

Preferably, the step of determining whether the use of the electrodynamic braking system is sufficient to fulfill the emergency braking request may also comprise the step of comparing the measured load transfer with an objective load transfer value determined as a function of the emergency braking request.

The advantage achieved by the present invention is therefore to provide a solution that makes it possible to verify the correct operation of a railway vehicle braking system and to provide a solution that makes it possible to use the electrodynamic braking system of a railway vehicle safely even during an emergency braking.

Various aspects and embodiments of a method of execution of a method for detecting a braking action of a railway vehicle and of a method for emergency braking of a railway vehicle according to the invention have been described. It is understood that each embodiment may be combined with any other embodiment. The invention, moreover, is not limited to the described embodiments, but may be varied within the scope defined by the accompanying claims.

The invention claimed is:

1. A method for detecting a braking action of a railway vehicle (RV) comprising steps of: monitoring load transfer towards a first axle of the railway vehicle (RV) from a second axle of the railway vehicle (RV), following the first axle according to direction of travel (d) of the railway vehicle;
   if load transfer exceeds a predetermined threshold, determining that the railway vehicle (RV) is braking.

2. The method according to claim 1, wherein the step of monitoring load transfer towards the first axle of the railway vehicle (RV) from the second axle of the railway vehicle (RV) comprises the steps of:
   measuring a pressure (P1) acting on the first axle of the railway vehicle (RV);
   measuring a pressure (P2) acting on the second axle of the railway vehicle (RV); and
   determining the load transfer through difference between the measured pressure (P1) acting on the first axle and measured pressure (P2) acting on the second axle.

3. The method according to claim 2, wherein the pressure (P1) acting on the first axle of the railway vehicle (RV) is measured through a measurement of a pressure of a first pneumatic shock absorber associated with said first axle, and the pressure (P2) acting on the second axle of the railway vehicle is measured through a measurement of the pressure of a second pneumatic shock absorber associated with said second axle.

4. The method according to claim 2, wherein the pressure acting on the first axle of the railway vehicle is measured through a first strain gauge sensor means arranged to measure a deformation of a first spring of a first shock absorber associated with said first axle, and the pressure acting on the second axle of the railway vehicle is measured through a second strain gauge sensor means arranged to measure a deformation of a second spring of a second shock absorber associated with said second axle.

5. The method according to claim 1, wherein the step of monitoring the load transfer towards a first axle of the railway vehicle from a second axle of the railway vehicle comprises the steps of:
   measuring a pitch inclination (A) of the railway vehicle;
   determining a load transfer value according to the measured pitch inclination (A).

6. The method according to claim 5, wherein the pitch inclination (A) of the railway vehicle is measured through a gyroscopic sensor means.

7. The method according to claim 5, wherein the pitch inclination (A) of the railway vehicle is measured through an accelerometric sensor means.

8. The method according to claim 1, wherein the first axle and the second axle belong to a same bogie.

9. The method according to claim 1, wherein the first axle and the second axle belong to two separate bogies.

10. An emergency braking method of a railway vehicle (RV) comprising the steps of:
    detecting an emergency braking request;
    when the emergency braking request has been detected, activating an electrodynamic braking system to decelerate the railway vehicle (RV);
    applying the method for detecting a braking action of a railway vehicle according to claim 1;
    if it has been determined that the railway vehicle (RV) is braking, determining that the electrodynamic braking system is operating correctly and using the electrodynamic braking system to at least partially fulfill the emergency braking request;
    if it has been determined that the railway vehicle is not braking, determining that the electrodynamic braking system is not operating correctly and using a pneumatic braking system to fulfill the emergency braking request.

11. The emergency braking method of a railway vehicle according to claim 10, wherein if it has been determined that the electrodynamic braking system is operating correctly and is used to at least partially fulfill the emergency braking request, the emergency braking method further comprises the steps of:
    determining whether use of the electrodynamic braking system is sufficient to fulfill the emergency braking request;
    if it is determined that the use of the electrodynamic braking system is not sufficient, activating also the pneumatic braking system to fulfill the emergency braking request.

12. The emergency braking method of a railway vehicle according to claim 11, wherein the step of determining whether the use of the electrodynamic braking system is sufficient to fulfill the emergency braking request further comprises the step of:
    comparing measured load transfer with a target load transfer value determined as a function of the emergency braking request.

* * * * *